UNITED STATES PATENT OFFICE.

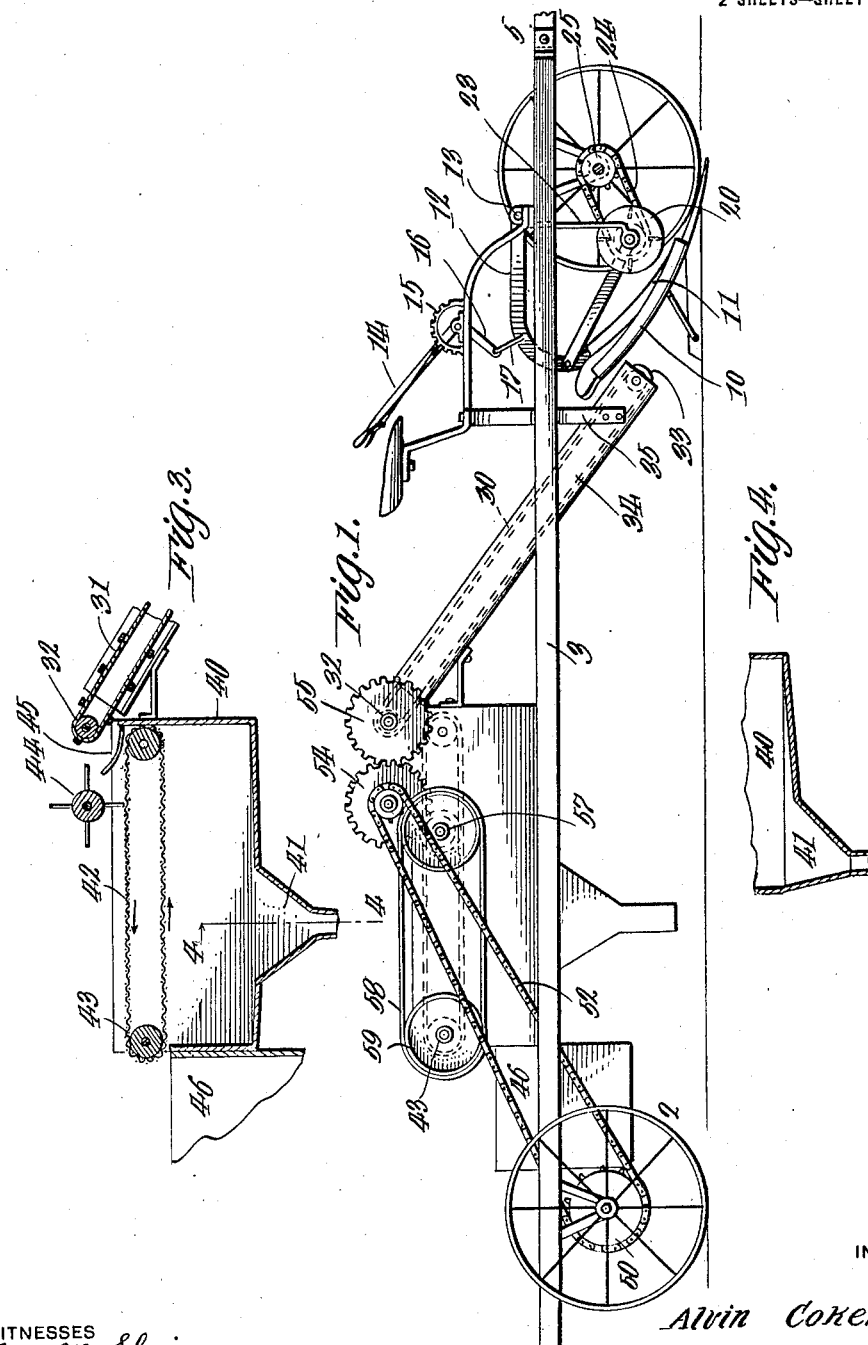

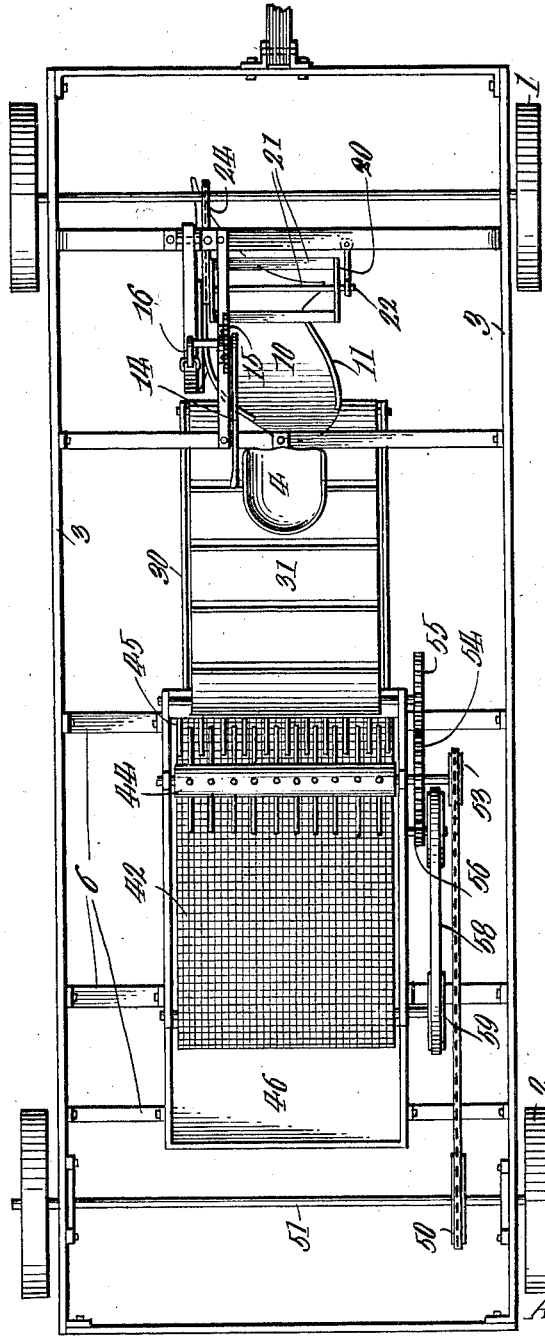

ALVIN COKER, OF FRANKLIN, TEXAS.

GRASS-DESTROYER.

1,332,321.　　　　　Specification of Letters Patent.　　Patented Mar. 2, 1920.

Application filed March 15, 1918. Serial No. 222,634.

*To all whom it may concern:*

Be it known that I, ALVIN COKER, a citizen of the United States, residing at Franklin, in the county of Robertson and State of Texas, have invented certain new and useful Improvements in Grass-Destroyers, of which the following is a specification.

This invention belongs in the class of harrows and diggers, and more especially to those including an endless carrier and a plow pivoted at its front; and the object of the same is to produce a machine for destroying or digging up Bermuda or Jackson grass and other noxious plants and weeds, sifting the earth off their roots and dropping it back on the ground, and collecting the tops and the roots so that they may be burned or otherwise destroyed.

The invention contemplates an organized structure whereby all steps of its operation are automatically performed at one passage of the machine over the earth, and it includes a machine which may be drawn by a single pair of horses and controlled by a single operator.

Details are set forth in the following specification, and reference is made to the accompanying drawings, wherein:—

Figure 1 is a side elevation of this machine complete, and

Fig. 2 is a plan view thereof,

Fig. 3 is a longitudinal sectional detail through the hopper, and

Fig. 4 is a cross sectional detail on the line 4—4 of Fig. 3.

Mounted on front wheels 1 and rear wheels 2 is a main framework 3 carrying a driver's seat 4 and adapted to be drawn by a pair of horses or a motor vehicle hitched thereto at 5. I will say here that, whereas I have shown in the drawings and described below the means for taking power from both the front and rear axles, it is quite possible that power could be generated by a motor or prime mover mounted on the frame; and in fact, if the motor were large enough, it could propel the machine instead of having the same drawn forward at 5. Said frame in Fig. 2 is shown as a rectangular structure having within it a plurality of cross bars 6 upon which the several instrumentalities hereinafter described are supported and carried, but I do not wish to be limited in this particular nor with respect to the details set forth below, excepting as brought out in the appended claim.

Beneath the forward portion of the frame is supported a plow of appropriate size and configuration, its mold board 10 having flanges 11 along both edges thereto so that the material dug up by the plow point will pass to the rear over the mold board rather than slip off the same as usual with plows which turn a furrow. The plow beam 12 is pivoted at 13 to the main frame so that it is capable of being raised and lowered, and a hand lever 14 moving alongside a toothed sector 15 actuates a crank arm 16 which is connected by a link 17 to said beam, so that as the lever is set the beam and the plow point are raised or lowered by the driver as described.

Contiguous to the plow as best seen in Fig. 1 is a cutter consisting of a reel having heads or disks 20 with interposed blades 21 as seen in Fig. 2, the whole having a shaft 22 rotatably mounted in suitable supports 23 and the blades or knives 21 extending to the right over the mold board as shown in Fig. 2. Rotary motion is communicated to this cutter by means of a sprocket thereon connected by a chain belt 24 with a driving sprocket 25 fast on the front axle 26, and therefore as the team progresses forward the rotation of the front wheels and axle causes the rotation of the cutter in the same direction, and the blades thereof chop up the grass and the tops of noxious plants at the same time that the plow point digs up their roots.

Just in rear of the plow is an elevator indicated broadly by the numeral 30, the same by preference being composed of a transversely slotted apron 31 moving over upper and lower rollers 32 and 33 mounted in the ends of a frame 34, the latter being supported as at 35 from the main frame 3. The forward and lower end of the elevator underlies the rearward and upper end of the mold board 10, so that the sods and clods passing upward over the frame between its flanges 11 are dropped onto the upper and upwardly moving stretch of the elevator 30 and by the latter delivered to the hopper yet to be described.

The hopper has a box-like body 40 mounted on the main frame 3 and the same has its bottom tapering and inclined downward to a spout 41 so disposed that the siftings delivered thereby will be dropped onto the earth a little to one side of the furrow or channel produced by the plow. Within said body near its upper portion is an endless moving screen 42 traveling over rollers 43, the forward of which underlies the upper and rearward roller 32 of the elevator so that the grass delivered by the latter drops onto the screen and is carried to the rear as shown by the arrows in Fig. 3. Just above and co-acting with the upper run of said screen is a rotary beater 44 having several series of fingers or teeth interposed between others numbered 45 carried fixedly by the front end of the body 40 just under the rear roller of the elevator, and the purpose of this beater is to break up the clods or sods delivered by the elevator and toss them onto the screen while the screen sifts out the earth and passes it back through the spout 41 of the hopper onto the ground. The tops of the grasses and other plants, together with their larger and smaller roots, are meanwhile carried to the rear along the upper stretch of the screen, and delivered into a receptacle such as a basket 46 removably mounted on the rear portion of the main frame 3; and from time to time this receptacle will be emptied or will be replaced by another which is already empty so that the tops and roots collected may be carried away and destroyed.

A sprocket wheel 50 on the rear axle 51 is connected by a chain belt 52 with a sprocket 53 on the shaft of the beater 44, and said shaft also carries a gear 54 meshing with another gear 55 on the upper roller 32 of the elevator and with a pinion 56 on a stub shaft 57, the latter having a pulley connected by a belt 58 with a similar pulley 59 on the shaft of the rear roller 43 of the screen 42. By this simple means, power produced by the revolution of the rear axle 51 is communicated to the several instrumentalities above described so that the elevator moves upward, the beater moves forward (see arrows in Fig. 1) and at the same time the moving screen travels in the direction of the arrows in Fig. 3 and at a more rapid rate of speed. As above suggested, however, both the cutter-driving mechanism and that just explained in detail, may be driven by a motor carried on the main frame if preferred.

As this machine is drawn or driven over the ground, the plow is adjusted by the hand lever 14 to sink its tip thereinto the desired distance, according to the nature of the grasses or weeds to be exterminated, and this element digs up the sods or clods while the cutter severs the plants or heads in a manner which will be clear. Both are carried upward and rearward over the mold board 10 between its flanges 11 and dropped onto the elevator 30, and the latter carries them upward to the hopper 40. Before falling into the same the clods are broken up by the fingers of the beater and the fingers 45 with which they coact, and the earth is sifted out by the screen 42 and dropped back onto the ground, while the tops, plants, and roots are carried rearward over the moving screen 42 and dropped into the receptacle 46. From time to time the receptacle is removed or replaced by another one, and the weeds and grasses carried away and destroyed as by burning. If the receptacle be removed entirely, then the tops will be dropped onto the ground where they may be subsequently raked into piles or rows and collected at a subsequent operation, or by another operator. It is quite possible to use this machine for digging small plants, such for instance as beans, in which case the same action will take place excepting that perhaps the cutter should be removed so that the tops of the plants will not be injured, and the beater might also be removed so that the bean pods would not be knocked off the vines. However, I reserve the widest latitude as to the uses to which this machine may be put as well as the details of construction.

What is claimed as new is:—

In a machine of the class described, the combination with a main frame, a box-like hopper carried thereby and having an outlet in its bottom near its rear end, and an endless screen mounted in the top of the hopper with its upper stretch moving horizontally rearward to deliver the coarser material beyond the hopper and its lower stretch moving forward to act the second time on the finer material, of fingers projecting from the end of said hopper inward over the screen, a rotary beater mounted across the hopper with its arms moving between said fingers and contacting with the upper stretch of the screen to force the material rearwardly thereon, and means for constantly delivering material onto the fingers.

In testimony whereof I affix my signature in presence of two witnesses.

ALVIN COKER.

Witnesses.
 AUBRA G. COX,
 R. L. RUCKER.